Figure 1:
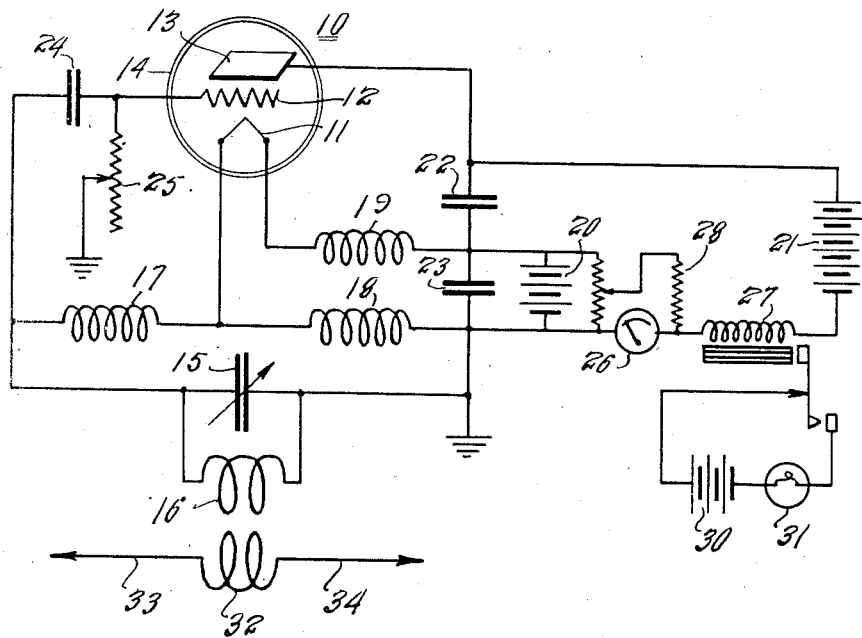

Feb. 21, 1933.                P. S. EDWARDS ET AL                1,898,432

REACTANCE CONTROLLED RELAY

Filed Oct. 2, 1929

Inventors
PAUL S. EDWARDS
AND C. D. BARBULESCO
By Semmes & Semmes
Attorneys

Patented Feb. 21, 1933

1,898,432

UNITED STATES PATENT OFFICE

PAUL S. EDWARDS, OF FORT MEADE, MARYLAND, AND CONSTANTIN D. BARBULESCO, OF DAYTON, OHIO

REACTANCE CONTROLLED RELAY

Application filed October 2, 1929. Serial No. 396,884.

This invention relates to reactance controlled relays and more particularly to means for smoothly operating a mechanical or master relay.

Broadly, the invention contemplates the modulation of a current at a frequency equal or close to the proper frequency of vibration of a contacting member so that the closing and opening of a secondary circuit controlled by the member takes place for exactly the same values of the mean energizing current due to the description of the residual magnetism in the relay.

An object of the invention is to provide means for smooth variation of the energizing D. C. current where a relay closes and opens at different values.

Another object of the invention is to provide means to close and open a mechanical or master relay for the same values of the magnetizing current, when this current varies within small limits around the value by which the magnet operates.

Figure 2:
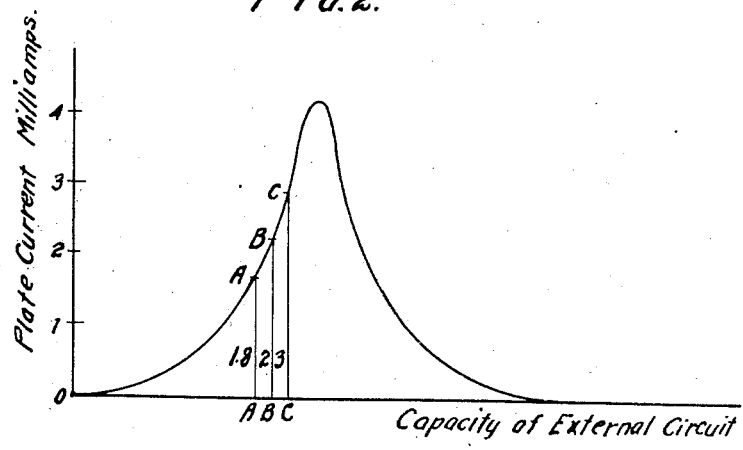

Other objects of the invention will appear from the following description taken in connection with the drawing, which forms a part of the specification, and in which:

Figure 1 comprises a schematic view illustrating the various parts that go to make up the present invention, and Figure 2 is a diagram of a resonance curve.

Referring to the drawing for more specific details of the invention, 10 represents generally a vacuum tube having a filament 11, a grid 12 and a plate 13 enclosed within an evacuated envelope or container 14.

Connected to the input and output circuits of the tube is a low loss tank circuit comprising a large variable capacitance 15 and a small inductance 16. The value of this capacity and inductance determine and control the frequency at which the tube oscillates.

Connected to the filament 10 are high frequency choke coils 17 and 18. These are composed of a relatively large number of turns of wire and are connected respectively in the grid and plate circuit of the tube.

When in operation, these choke coils introduce or generate two driving electromotive forces which may be considered substantially 180° out of phase. The geometric sum of these separate electromotive forces introduce and maintain a heavy oscillating current in the circuit. A third choke coil 19 is connected to the filament and serves to maintain it at high potential with respect to the ground.

The electrical supply for the tube comprises a filament battery 20 and a plate battery 21 both of which are maintained at ground potential, and bypass condensers 22 and 23 of large value permitting circulation of high frequency currents are connected in the plate circuit.

The frequency at which the tube operates is controlled mainly by the value of the condenser 15 and the inductance 16. The condenser 15 is of large value and hence the interelectrode capacity of the tube becomes substantially negligible in effect.

Connected in the grid circuit is a grid condenser 24 and a leak resistance 25. The value of the condenser and resistance is so chosen that the high frequency oscillations generated in the tank circuit will periodically charge the condenser up to a certain value and then discharge through the leak resistance to the ground. Therefore, the condenser 24 and the resistance 25 produce a periodic interruption and choking of the high frequency oscillations.

Connected in the output circuit of the tank is a meter 26 and a relay 27. The meter 26 is connected with a potentiometric arrangement 28 which opposes the current flowing from the filament to the plate battery and the relay is adapted to close a secondary circuit including a battery 30 and a device 31. The opening and closing of this relay which operates at different values is the essence of the present invention.

Inductively coupled to the tank circuit is an exterior circuit comprising a coupling or loading coil 32 and conductors 33 and 34. This coupling may be utilized for inducing losses in the tank circuit to increase the frequency of the periodic oscillations and effect a corresponding increase in the value of the plate current.

The variations in the plate current due to the approach of mass close to the external circuit serve to operate the mechanical or master relay. It has been found that, in instances where the modulated frequency is very high, the mechanical relay will not close and open the secondary circuit for the same value of the plate current. For instance, if the armature has been adjusted, so that the relay closes the contact for a current of two (2) milliamperes through its coil, it will not open if the external cause has departed and the plate current has dropped to one point five (1.5) milliamperes.

This is objectionable for it decreases the sensitivity of the apparatus. It may be overcome by using an ultra sensitive relay in place of the sensitive meter connected in the output circuit with the potentiometric arrangement, but this materially increases the cost of production and it is therefore not desirable.

The following means has been found extremely simple and effective. When the apparatus has been adjusted, so that the external circuit is in resonance or close to resonance to the tank circuit, the plate circuit has a value of say one point eight (1.8) milliamperes corresponding to the ordinate AA, the relay is not affected. For this situation, we can adjust the frequency of the modulation just below the natural frequency of vibration of the armature of the mechanical relays. This can be easily accomplished by proper selection of the grid leak as previously explained.

When mass approaches the external circuit, its capacity increases. This increases the load in the tank and consequently increases the plate current to a greater value BB=2 milliamperes, for which the armature is attracted by the electromagnet and closes the secondary circuit.

When the plate current increases, the frequency of modulation increases approaching the resonant period of vibration of the armature, which starts to vibrate violently closing and breaking contact very rapidly. A greater increase in the plate current due to a closer position of the mass to the external circuit will further increase the modulated frequency and the armature will not be further affected. This insures a very positive contact.

When the mass is removed or withdrawn, the plate current moves down from CC=three (3) milliamperes, and as soon as it reaches two (2) milliamperes=BB, the armature starts to vibrate violently due to mechanical resonance, thus overcoming the force due to residual magnetism in the core and the contact is broken as soon as the plate current comes back to the normal value AA=one point eight (1.8) milliamperes where there is nothing to affect the external circuit.

It will thus be seen that if the current is modulated at a frequency equal or close to the proper frequency of vibrations of the contacting member, the closing and opening of the secondary circuit will take place for exactly the same value of the main energizing current due to the destruction of the residual magnetism.

Although this invention has been described in connection with certain specific embodiments, the principles involved are susceptible of numerous other applications that will readily occur to persons skilled in the art. The invention is, therefore, to be limited only as such limitations are clearly imposed by the appended claims.

Having thus described the various features of the invention, what we claim as new and desire to secure by Letters Patent, is:

1. A self-modulating high frequency oscillator having means for modulating the high frequency currents in combination with a relap operated by the output of said oscillator and vibrating at the frequency corresponding to the frequency of modulation when the output current is barely sufficient to actuate said relay.

2. A self-modulated high frequency oscillator having means for modulating the high frequency currents in combination with a responsive device operated by the output current from said oscillator and having a natural mechanical period of vibration of the same frequency as the modulating frequency when the output current is barely sufficient to actuate the device, and means for forming electrical contact in the responsive device due to changes in values of the energizing current.

3. In combination, a mechanical relay having an armature with a fixed natural period of vibration and a field requiring a predetermined current to actuate the relay, means to supply a modulated current to said field whose frequency of modulation varies with its intensity, and which means is so regulated that the frequency of modulation of said current is equal to the natural period of vibration of the armature when the intensity of the current is equal to that required to actuate the relay and means to vary the intensity of said current.

4. In combination, a mechanical relay having an armature with a fixed natural period of vibration and a field requiring a predetermined current to actuate the relay, a self-modulated high frequency oscillator having means for modulating the high frequency currents and its output connected to said relay, said modulating means being so regulated that the frequency of modulation is equal to the natural period of vibration of the armature when the intensity of its output current is equal to that required to actuate the relay, and means to vary the intensity of the output current.

5. In combination with a self-modulated high frequency oscillator having means for modulating the high frequency currents, a mechanical relay connected in the plate circuit of the oscillator and having a natural period of vibration adapted to be actuated by the mean value of the plate current of the oscillator, a secondary circuit controlled by the relay, said means for modulating the high frequency currents adapted to be adjusted so as to produce resonance in the armature of the relay at the point of closing or breaking the secondary circuit.

6. In combination with a self-modulated high frequency oscillator, having means for modulating the high frequency currents, a relay operable by electrical variations in a magnetizing element thereof, said magnetizing element being connected to the output of said oscillator, said means for modulating the high frequency currents changing with the intensity of the energizing current for destroying the residual magnetizing forces by modulating the energizing current at a frequency substantially the same as the natural frequency of vibration of the contacting member of the relay when the intensity of the energizing current is barely sufficient to actuate the relay.

In testimony whereof we affix our signatures.

PAUL S. EDWARDS.
CONSTANTIN D. BARBULESCO.